US010984219B2

United States Patent
Wach et al.

(10) Patent No.: US 10,984,219 B2
(45) Date of Patent: Apr. 20, 2021

(54) FINGERPRINT PROCESSING WITH LIVENESS DETECTION

(71) Applicant: IDMISSION LLC, Boulder, CO (US)

(72) Inventors: Hans Brandon Wach, Longmont, CO (US); Ashim Banerjee, Boulder, CO (US); Sandeep Gandhi, San Ramon, CA (US)

(73) Assignee: IDMISSION, LLC, Boulder, CO (US)

( * ) Notice: Subject to any disclaimer, the term of this patent is extended or adjusted under 35 U.S.C. 154(b) by 90 days.

(21) Appl. No.: 16/516,764

(22) Filed: Jul. 19, 2019

(65) Prior Publication Data

US 2021/0019486 A1   Jan. 21, 2021

(51) Int. Cl.
G06K 9/00 (2006.01)
G06K 9/03 (2006.01)
G07C 9/37 (2020.01)

(52) U.S. Cl.
CPC ......... G06K 9/001 (2013.01); G06K 9/00013 (2013.01); G06K 9/00114 (2013.01); G06K 9/036 (2013.01); G07C 9/37 (2020.01)

(58) Field of Classification Search
CPC .... G06K 9/001; G06K 9/00114; G06K 9/036; G06K 9/00013; G07C 9/37
See application file for complete search history.

(56) References Cited

U.S. PATENT DOCUMENTS

| | | | |
|---|---|---|---|
| 6,851,051 B1 | 2/2005 | Bolle et al. | |
| 8,856,541 B1 | 10/2014 | Chaudhury et al. | |
| 9,313,200 B2 | 4/2016 | Hoyos | |
| 9,361,507 B1 | 6/2016 | Hoyos et al. | |
| 9,424,458 B1 | 8/2016 | Mather et al. | |
| 9,710,691 B1 | 7/2017 | Hatcher et al. | |
| 9,785,823 B2 | 10/2017 | Mather et al. | |
| 2005/0041136 A1* | 2/2005 | Miyata | H04N 5/23212 348/345 |
| 2005/0134427 A1 | 6/2005 | Hekimian | |
| 2007/0253605 A1* | 11/2007 | Maurer | G06K 9/036 382/124 |
| 2008/0253625 A1 | 10/2008 | Schuckers et al. | |
| 2010/0113952 A1 | 5/2010 | Raguin et al. | |
| 2013/0227651 A1 | 8/2013 | Schultz et al. | |
| 2013/0297217 A1* | 11/2013 | Bangera | G16H 10/60 702/19 |
| 2014/0212008 A1 | 7/2014 | Hatcher et al. | |
| 2014/0289867 A1* | 9/2014 | Bukai | G06Q 20/4016 726/28 |
| 2014/0337930 A1 | 11/2014 | Hoyos et al. | |
| 2015/0227774 A1* | 8/2015 | Balch | G06K 9/00033 382/124 |

(Continued)

*Primary Examiner* — John B Strege

(74) *Attorney, Agent, or Firm* — Anand P Narayan

(57) ABSTRACT

Methods, systems, and computer readable media for fingerprint capture and verification are described. A camera is utilized to capture a set of images at a first resolution. A focal length for at least one object in the plurality of images is verified to be greater than a minimum focus threshold. The images are converted to corresponding binary images. A finger is identified in the one or more binary images. A still image of the finger is captured at a second and higher resolution. Image processing filters are applied to the still image to generate a fingerprint image which is transmitted to an application server for verification.

19 Claims, 14 Drawing Sheets

(56) References Cited

U.S. PATENT DOCUMENTS

| | | | |
|---|---|---|---|
| 2015/0286855 A1* | 10/2015 | Neskovic | G06K 9/00087 |
| | | | 382/125 |
| 2016/0057138 A1 | 2/2016 | Hoyos et al. | |
| 2016/0180142 A1* | 6/2016 | Riddle | G06K 9/00375 |
| | | | 382/124 |
| 2016/0232401 A1* | 8/2016 | Hoyos | G06K 9/00107 |
| 2017/0193314 A1* | 7/2017 | Kim | G06F 21/35 |

* cited by examiner

FINGERPRINT PROCESSING WITH LIVENESS DETECTION

TECHNICAL FIELD

Embodiments relate generally to biometric identification, and more particularly, to methods, systems and computer readable media for fingerprint capture and processing.

BACKGROUND

Biometric methods of authentication are widely adopted in a variety of applications. Fingerprints of users are a commonly used biometric form of authentication for e-commerce, device authentication, building access, etc. Traditionally, dedicated fingerprint scanners deployed as stand-alone devices, or as hardware peripherals, were utilized for capturing fingerprints of users.

With the proliferation of smartphones and improved cameras deployed in smartphones, smartphone-camera based fingerprint capture and authentication could vastly improve fingerprint based authentication. At the same time, there is a need for the fingerprint authentication methods to be secure and be robust against spoofing and other attacks.

SUMMARY

Implementations described herein relate to capture of a fingerprint image. In some implementations, a computer-implemented method includes activating a camera and a camera light on a user device, capturing, with the camera, a plurality of images at a first resolution, converting, using a processor on the user device, one or more of the plurality of images to corresponding one or more binary images, detecting a hand in the one or more binary images, identifying at least one finger in the one or more binary images, capturing, with the camera, a still image of the at least one finger at a second resolution, applying one or more image processing filters to the still image to generate a fingerprint image, and transmitting the fingerprint image, over a network, to a server. In some implementations, the second resolution is greater than the first resolution.

In some implementations, the method further includes determining a detection score for the identified at least one finger based on a detected length of the identified at least one finger, determining whether the detection score meets a detection threshold, if the detection score meets the detection threshold, causing the capturing of the still image at the second resolution, and if the detection score does not meet the detection threshold, causing a capturing, with the camera, a second set of a plurality of images at the first resolution.

In at least some of the implementations, applying one or more image processing filters comprises converting the still image to a grayscale image, inverting the grayscale image, enhancing contrast in the inverted grayscale image, binarizing the contrast enhanced inverted grayscale image, and removing finger edges in the binarized enhanced inverted grayscale image to generate an inkified image.

In some implementations, the method further includes identifying ridges in the inkified image, and removing ridges thicker than a predetermined width. In some implementations, the method further includes computing a quality score, where the quality score is based on a percentage of ridges removed, determining whether the quality score meets a quality threshold, and if the quality score meets the quality threshold, performing image enhancement of the inkified image.

In at least some implementations, the image enhancement comprises applying a block-wise Gabor filter enhancement to the inkified image.

In at least some implementations, identifying the at least one finger comprises detecting a left side and a right side of each of the at least one finger based on detecting four pairs of transitions in a horizontal trace of the detected hand, and detecting a finger tip based on detection of transitions in vertical traces of the detected hand between the left side and the right side of each of the at least one finger.

In some implementations, the method further includes verifying that a focal length for at least one object in the plurality of images is greater than a minimum focus threshold.

In some implementations, the detecting the hand comprises transforming the one or more binary images to Hue-Saturation-Value (HSV) representations, shifting a hue channel in the HSV representations, and detecting the hand based on a match of the HSV representations to a skin tone model. In some implementations, the method further includes detecting liveness of the at least one finger.

In at least some implementations, the detecting the liveness of the at least one finger includes determining a challenge pattern for a plurality of fingers against which to match an input pattern, displaying, on a screen, a representation of the challenge pattern, receiving, from the camera, at least a first image of the hand and a second image of the hand, comparing the challenge pattern, the received first image and the received second image, and determining the liveness of the at least one finger based at least on the comparison of the challenge pattern, the received first image and the received second image.

In some implementations, the method further includes receiving from the server, over the network, a notification indicative of an NFIQ score of the fingerprint image being below a predetermined threshold. In some implementations, the first resolution is between 260 pixels and 1080 pixels, and wherein the second resolution is between 2 Megapixels and 6 Megapixels.

Some implementations include a system to authenticate a fingerprint image, the system comprising a mobile device. In some implementations, the mobile device includes a camera and a first processor such that the mobile device is configured to activate the camera and a camera light, wherein the camera is activated to capture a plurality of images at a first resolution, convert, using the first processor, one or more of the plurality of images to corresponding one or more binary images, detect a hand in the one or more binary images, locate at least one finger in the one or more binary images, capture a still image of the at least one finger using the camera at a second resolution, apply one or more image processing filters to the still image to generate the fingerprint image, and transmit the fingerprint image and at least one personal identifier associated with the fingerprint image.

In some implementations, the system further includes a server that comprises a storage device and a second processor, such that the server is configured to receive the fingerprint image from the mobile device and the at least one personal identifier associated with the fingerprint image from the mobile device, determine a NIST Fingerprint Image Quality (NFIQ) for the fingerprint image, convert the fingerprint image into a template representing minutiae points for each finger, and transmit the template and the at least one personal identifier to a biometric database for verification.

In at least some of the implementations, the at least one personal identifier comprises name, phone number, date of birth, address, or identification number.

In some implementations, the server is further configured to match the template and the at least one personal identifier to an entry previously stored in the storage device. In some implementations, the server is further configured to receive at least one data element associated with the at least one personal identifier from the biometric database upon verification.

Some implementations include a computer-readable storage device encoded with instructions that, when executed, cause one or more programmable processors of a computing device to perform operations comprising activating a camera and a camera light, wherein the camera is activated to capture a plurality of images at a first resolution, converting, using a processor, one or more of the plurality of images to corresponding one or more binary images, detecting a hand in the one or more binary images, identifying at least one finger in the one or more binary images, capturing a still image of the at least one finger using the camera at a second resolution, applying one or more image processing filters to the still image to generate a fingerprint image, and transmitting the fingerprint image to a server.

In some implementations, the operations further include determining a detection score for the identified at least one finger based on a detected length of the identified at least one finger, determining whether the detection score meets a detection threshold, if the detection score meets the detection threshold, causing the capturing of the still image at the second resolution, and if the detection score does not meet the detection threshold, causing a capturing, with the camera, a second set of a plurality of images at the first resolution.

In at least some of the implementations, the detection score for the identified at least one finger comprises a detected length of the at least one finger in pixels.

DETAILED DESCRIPTION

A technical problem in biometric capture and verification is the capture of fingerprints using cameras that are included in user devices such as smartphones.

Figure 1:
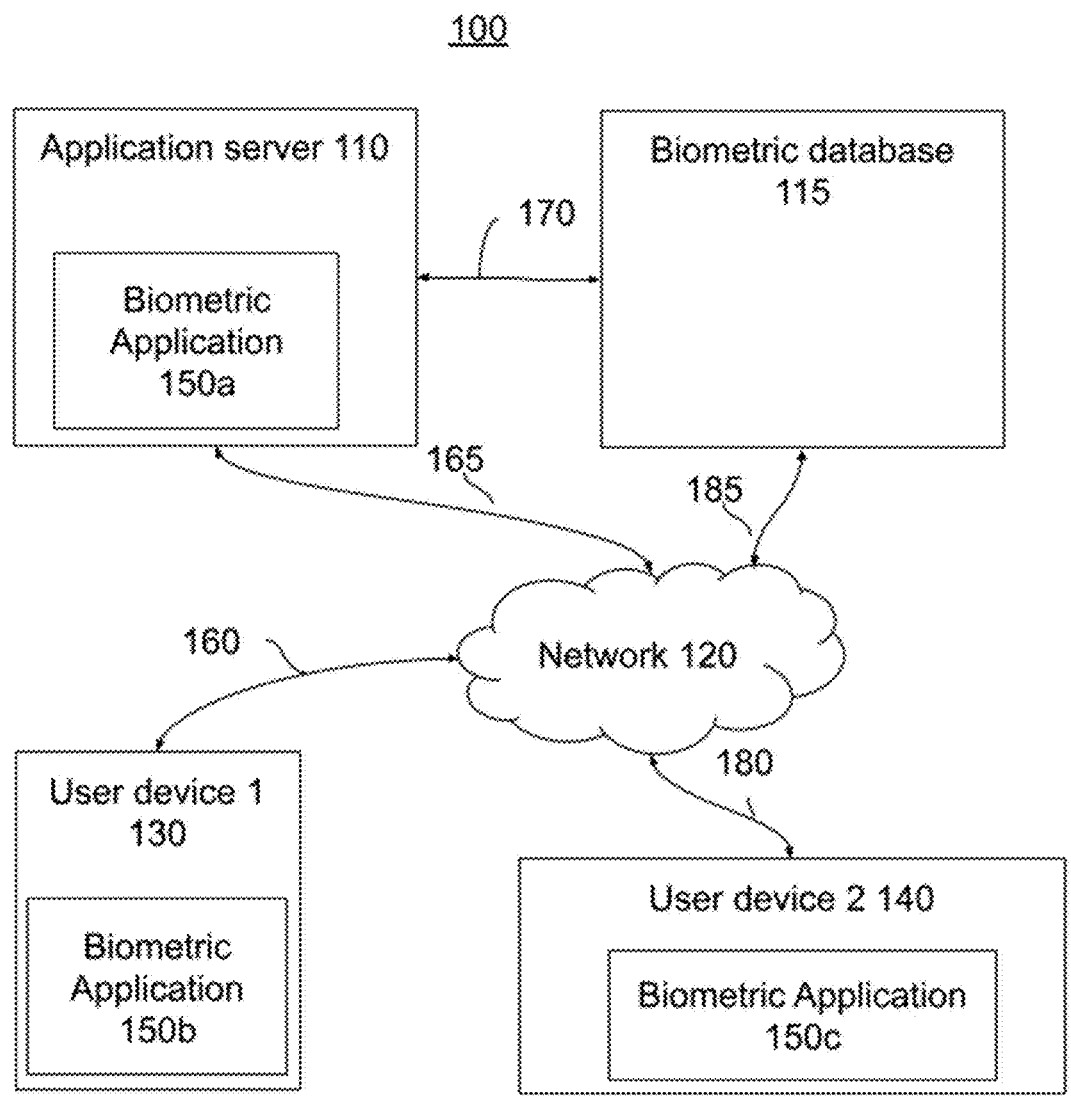
FIG. 1 is a diagram of an example network environment in which a biometric verification may be conducted, in accordance with some implementations.

FIG. 1 is a diagram of an example network environment in which a biometric verification may be conducted, in accordance with some implementations. An Application server 110 is configured to be coupled to a network 120 via signal line 165. Application server 110 may be a computer, e.g., a server computer, a dedicated biometric processor, a biometric processing system, or any other type of device that enables verification of user biometrics.

Network 120 can be any type of communication network, including one or more of the Internet, local area networks (LAN), wireless networks, switch or hub connections, a telephone network (e.g., a PSTN network, a cellular network, etc.), etc.

A biometric database 115 is configured to be coupled to network 120 via signal line 175. The biometric database 115 may also be coupled directly to Application server 110 via signal line 170.

User devices 130 (User device 1) and 140 (User device 2) may also be coupled to network 120 via signal lines 160 and 180, respectively. While FIG. 1 illustrates only two user devices, any number of user devices may be included in the environment. A user device can be any type of electronic device, e.g., desktop computer, telephone, VoIP enabled phones and applications, laptop computer, portable or mobile device, cell phone, smartphone, tablet computer, television, a wearable device, personal digital assistant (PDA), media player, game device, etc.

In some implementations, the Application server 110 and the user devices 130 and/or 140 can include one or more applications. For example, as shown in FIG. 1, Application server 110 may include Biometric application 150a, user device 130 may include Biometric application 150b, and user device 140 may include Biometric Application 150c.

In some implementations, Biometric application 150a may be a server application and Biometric application 150b may be a client application.

Figure 2:
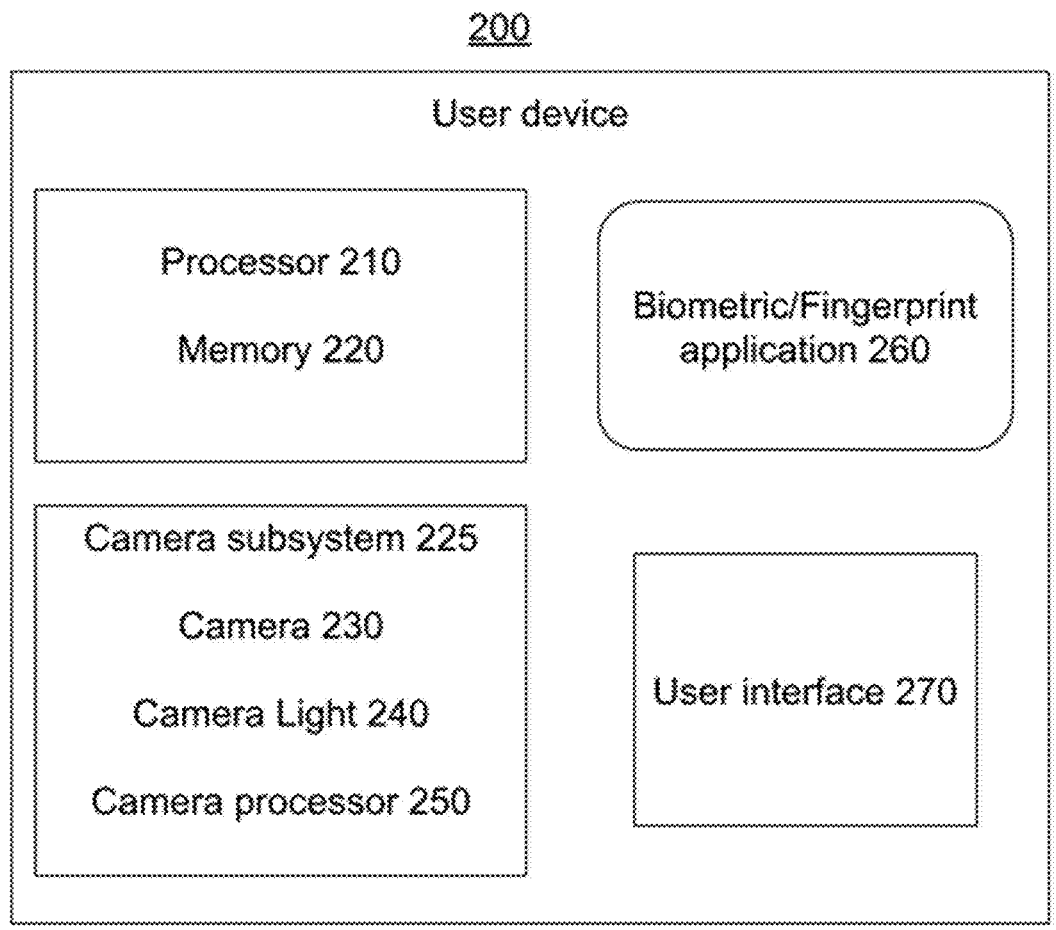
FIG. 2 is a diagram of an example user device configured for biometric capture and verification, in accordance with some implementations.

FIG. 2 is a diagram of an example user device 200 (a user device similar to one of user devices 130 and 140 illustrated in FIG. 1) configured for biometric capture and verification, in accordance with some implementations.

User device 200 includes a processor 210 and memory 220. User device 200 may further include a camera subsystem 225 that includes camera 230, a camera light (e.g. a LED light) 240, and a camera processor 250. In some implementations, the functionality of camera processor 250 may be included within processor 210.

Biometric/fingerprint application 260 may be configured to interface with the camera subsystem. User interface 270 may allow for a user to interact with the user device and to display text, audio, or video on the user device, and to transmit media and/or user input from the user device to the Application server or other user devices.

Figure 3A:
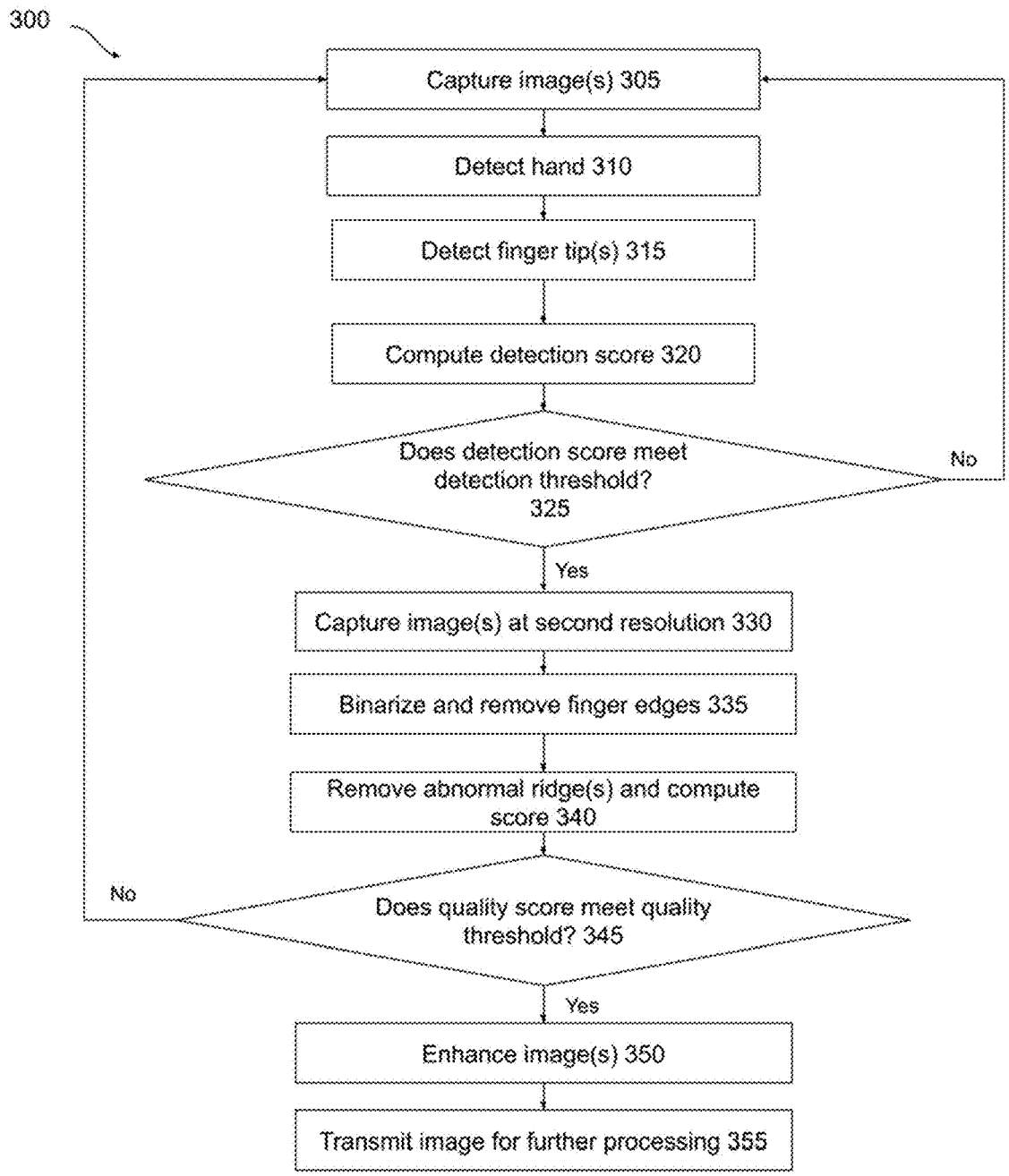
FIG. 3A is a flow chart illustrating fingerprint capture method, in accordance with some implementations.

FIG. 3A is a flow chart illustrating a fingerprint capture method 300, in accordance with some implementations.

At block 305, multiple images are captured at a specified resolution (for example, by camera 230 described with respect to FIG. 2). In some implementations, the camera is automatically activated on a user device when biometric/fingerprint application 260 is launched on the user device. The multiple images may be multiple frames of video captured by the camera.

In some implementations, the multiple images may be converted to a binary format. In some implementations, the binary images may be stored and utilized in subsequent processing.

Processing continues to block 310.

At block 310, the captured image(s) are processed to detect a hand in the image(s).

Processing continues to block 315 where finger tip(s) are detected and finger(s) are identified. In some implementations, finger identification is enabled by detecting a left side and a right side of a finger based on detecting four pairs of transitions in a horizontal trace of the detected hand. In some implementations, a finger tip is detected based on detection of transitions in vertical traces of the detected hand between the left side and the right side of each finger.

Processing continues to block 320. At block 320, a score is computed that is indicative of finger detection. In some implementations, the score is a length of a fingertip. In some implementations, the length is measured in units of pixels.

At block 325, the detection score is compared to a detection threshold. The detection threshold may be predetermined and configurable (for example, by application 260 described with respect to FIG. 2). In some implementations, the detection threshold may be specified by a server (for example, by application 150a described with respect to FIG. 1).

At block 325, if the detection score does not meet the detection threshold, processing continues to block 305 where image(s) are captured again.

At block 325, if the detection score meets the detection threshold, processing continues to block 330.

At block 330, still image(s) are captured using the camera at a higher resolution. In some implementations, a high dynamic range (HDR) setting may be utilized or another similar mode that is configured to capture a high resolution image. An objective is to rapidly detect a hand and fingers with relatively low resolution images, while capturing high resolution still image(s) for subsequent processing and generation of a fingerprint image.

In some implementations, blocks 305 and 330 may utilize the same resolution for capturing the images.

In some implementations, multiple low resolution images may be combined to generate a high resolution image.

Processing may continue optionally to block 335. At block 335, the images are binarized and/or finger edges are removed. This may enable better matching with fingerprints previously captured using other methods (for example, an ink based method and stored in database 115 described with respect to FIG. 1).

Processing continues to block 340. At block 340, abnormal ridges are removed. In some implementations, a ridge line may be considered to be abnormal if its thickness exceeds a certain predetermined width. Abnormal ridges may be present in the image as an artefact of image processing.

A quality score is computed based on a quantity of abnormal ridges that were removed as a result of the processing in block 340.

At block 345, the quality score is compared to a quality threshold. The quality threshold may be predetermined and configurable.

In some implementations, data from previous matches may be used to adaptively change the threshold. In some implementations, machine learning techniques may be utilized to adapt the threshold based on input signals received.

At block 345, if the quality score meets the quality threshold, processing continues to 350, where the image(s) may be enhanced.

In some implementations, image enhancement may use a Gabor filter.

At block 345, if the quality score does not meet the quality threshold, processing may continue to 305 and a fresh set of image(s) may be captured.

At block 355, the fingerprint image(s) may be transmitted to a server (for example, server 110 described with respect to FIG. 1) over a network (for example, network 120 described with respect to FIG. 1)

It will be appreciated that blocks 305-355 can be repeated in whole or in part or may be performed in a different order than shown in FIG. 3A.

For example, in some implementations, image enhancement in block 350 may be performed for all images, and a determination of whether the quality score meets the quality threshold may be made before transmission of the images for further processing.

Figure 3B:
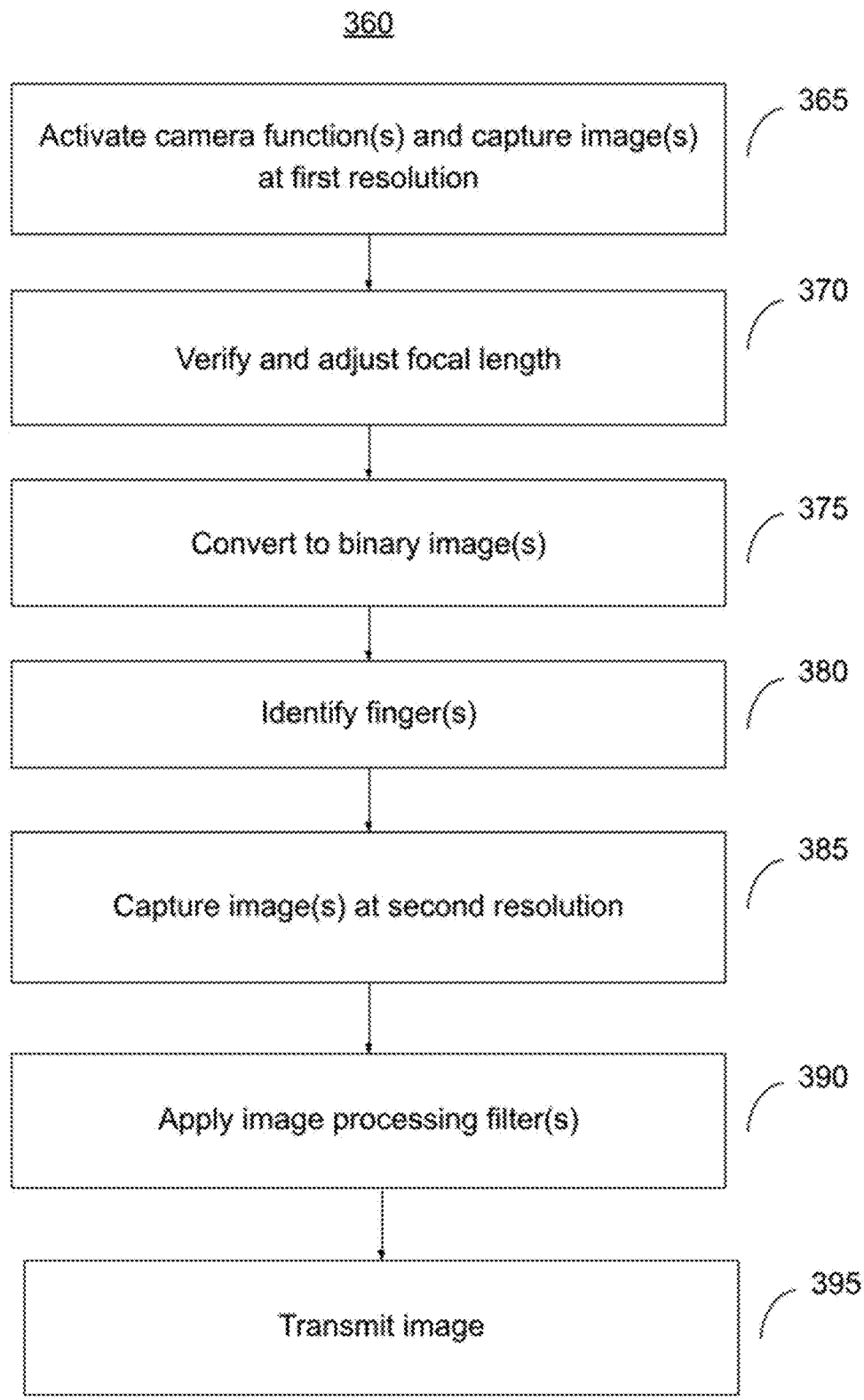
FIG. 3B is a flowchart illustrating an example biometric capture and verification method, in accordance with some implementations.

FIG. 3B is a flowchart illustrating a fingerprint capture method in accordance with some implementations.

The method 360 begins at block 365, where, on a user device (e.g. a user device similar to user device 200 illustrated in FIG. 2), a camera and a camera light are activated. Multiple images may be captured at a first resolution. In some implementations, multiple images may be captured in a video mode. For example, images may be captured at a resolution of 260 pixels, 360 pixels, 480 pixels, 720 pixels, 1080 pixels, and values in between. The resolution may be specified such that a minimum size of features in a hand be at least 2 or 3 pixels. In some implementations, the first resolution may be between 10 pixels and 2000 pixels to enable such feature size.

Processing continues to block 370. At block 370, a focal length for identified objects in the multiple captured images is computed. The computed focal length is compared (e.g. by a processor similar to processor 210 or processor 250) to a predetermined minimum focus threshold. If the computed focal length for any of the identified objects does not meet the predetermined minimum focus threshold, processing may revert back to block 365.

If the computed focal length for the object(s) meets the predetermined minimum focus threshold, processing continues to block 375, where the captured images are converted to corresponding binary images using an adaptive threshold algorithm.

In some implementations, a minimum focus threshold may not be utilized, and processing may proceed from block 365 to block 375.

Processing continues to block 380. One or more fingers are identified in the binary images at block 340 by processing contours in the binary images. The width of the contours in the binary images is compared to the size of typical finger tips. In some implementations, a finger is identified based on the width of the contours.

In some implementations, interpolation of the contours may be performed.

In some implementations, a determination of an identified hand (i.e. left hand or right hand) may be made based on a relative location of the contours in the binary images. Finger positions may be allotted to the binary images based on the location of the contours in the binary images.

Processing continues to block 385. At block 385, the camera is configured to capture images at a higher resolution (for example, still or HDR mode) and an image of the identified finger(s) is captured at a higher resolution. In some implementations, the resolution of the images may be between 2 Megapixels and 6 Megapixels.

In some implementations, the camera frame and focus may be adjusted to capture a subset of the identified fingers. In some implementations, the camera settings are adjusted at initialization to zoom out from the hand to enable a capture of the entire hand when a user places their hand in front of the camera.

In some implementations, images of all identified fingers may be captured.

Processing continues to block 390. At block 390, image processing filters may be applied to the image to resize the image and generate a fingerprint image. The fingerprint images may be converted into a template representing minutiae points for each finger.

Processing continues to block 395. At block 395, the fingerprint image may be transmitted by the user device over a network (for example, to a computing device similar to Application server 110).

It will be appreciated that blocks 365-395 can be repeated in whole or in part or may be performed in a different order than shown in FIG. 3B.

Figure 4A:
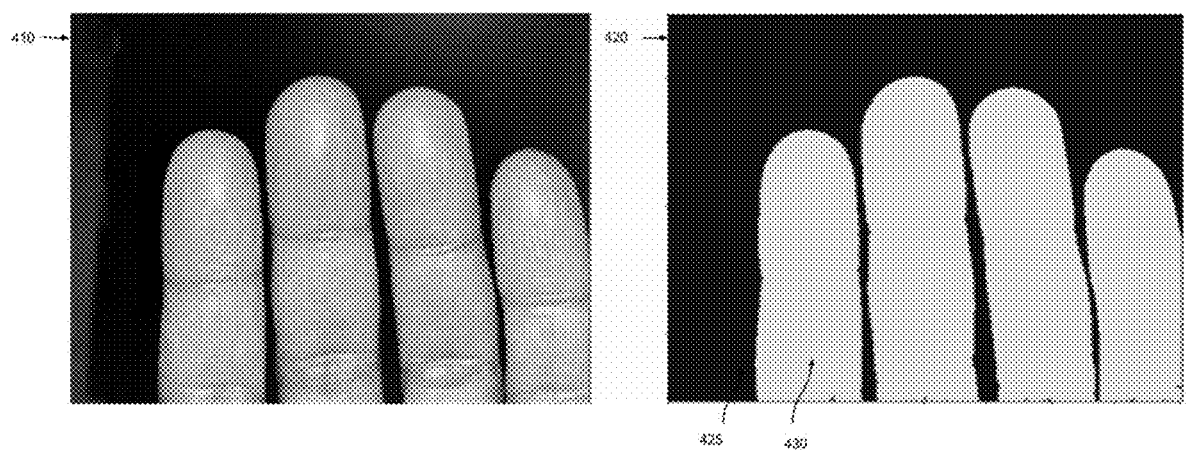
FIG. 4A depicts example hand detection, in accordance with some implementations

FIG. 4A depicts hand detection, in accordance with some implementations.

Hand detection may poses challenges when a background is cluttered. Detection of a hand in the captured image may be performed in a Hue-Saturation-Value (HSV) space. In some implementations, the captured image 410 is converted to its HSV representation 420.

In some implementations, a hue channel in the HSV representation may be shifted by 180 degrees to enable easier processing of the HSV image.

A hand is detected based on presence of human skin-tone color in the HSV image and is based on segmentation of pixels representing portions of the hand (430) from pixels representing surrounding areas (425) in the image.

In some implementations, hand detection may be performed using a binarized grayscale image.

Figure 4B:
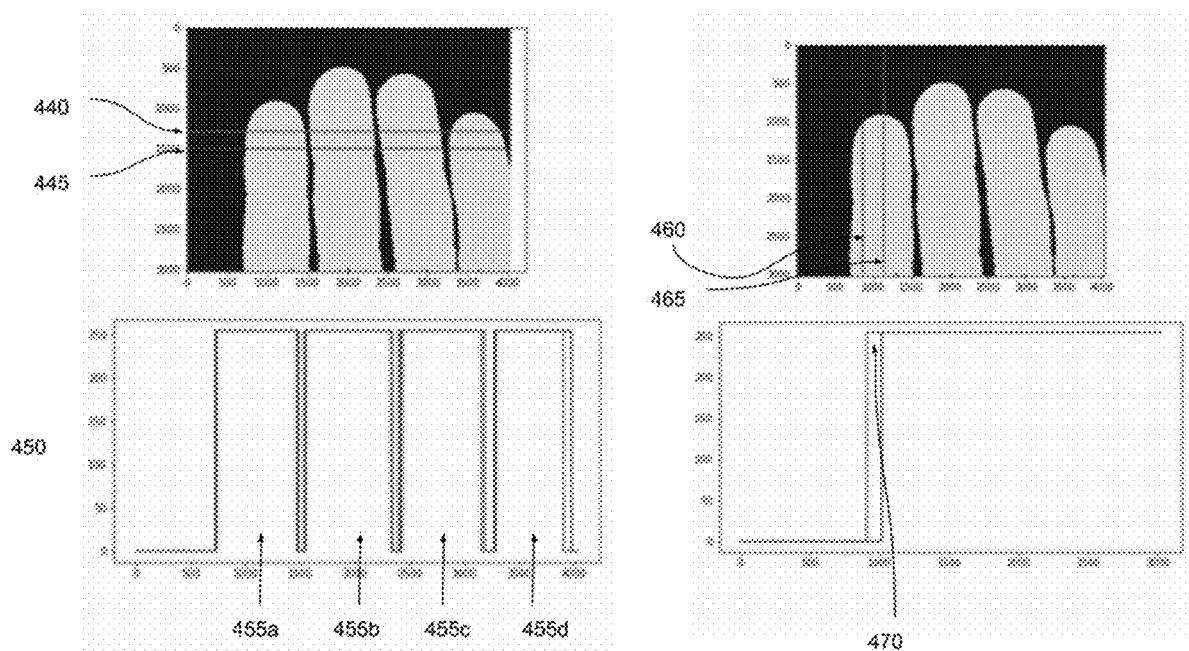
FIG. 4B depicts example finger tip detection, in accordance with some implementations.

FIG. 4B depicts an example of finger detection, in accordance with some implementations.

After a hand is detected, finger(s) are identified within the detected hand. In some implementations, a left side and a right side of each finger is detected based on detection of transitions in a horizontal trace (440, 445) of the detected hand. In some implementations, four pairs of transitions (455*a*, 455*b*, 455*c*, and 455*d*) are detected in a horizontal trace of the detected hand, indicative of the locations of the four fingers.

In some implementations, 1, 2, or 3 pairs of transitions may be detected in the horizontal trace, indicative of 1, 2, and 3 fingers, respectively.

In some implementation, areas within guiding lines that are displayed to a user for hand positioning may be taken into account when performing hand detection.

Finger tips are detected based on detection of transitions (470) in vertical traces (460, 465) of the detected hand between the left side and the right side of each finger. A height of the detected finger is indicative of the identity of the finger (index, ring, middle, little (pinky)) and an order of detection of the fingers is indicative of whether the detected hand is a left hand or a right hand.

In some implementations, the finger at may be placed at an angle in the image, and a top most left edge and a top most right edge may be utilized to serve as left side and right side bounds, respectively, for the finger.

Figure 4C:
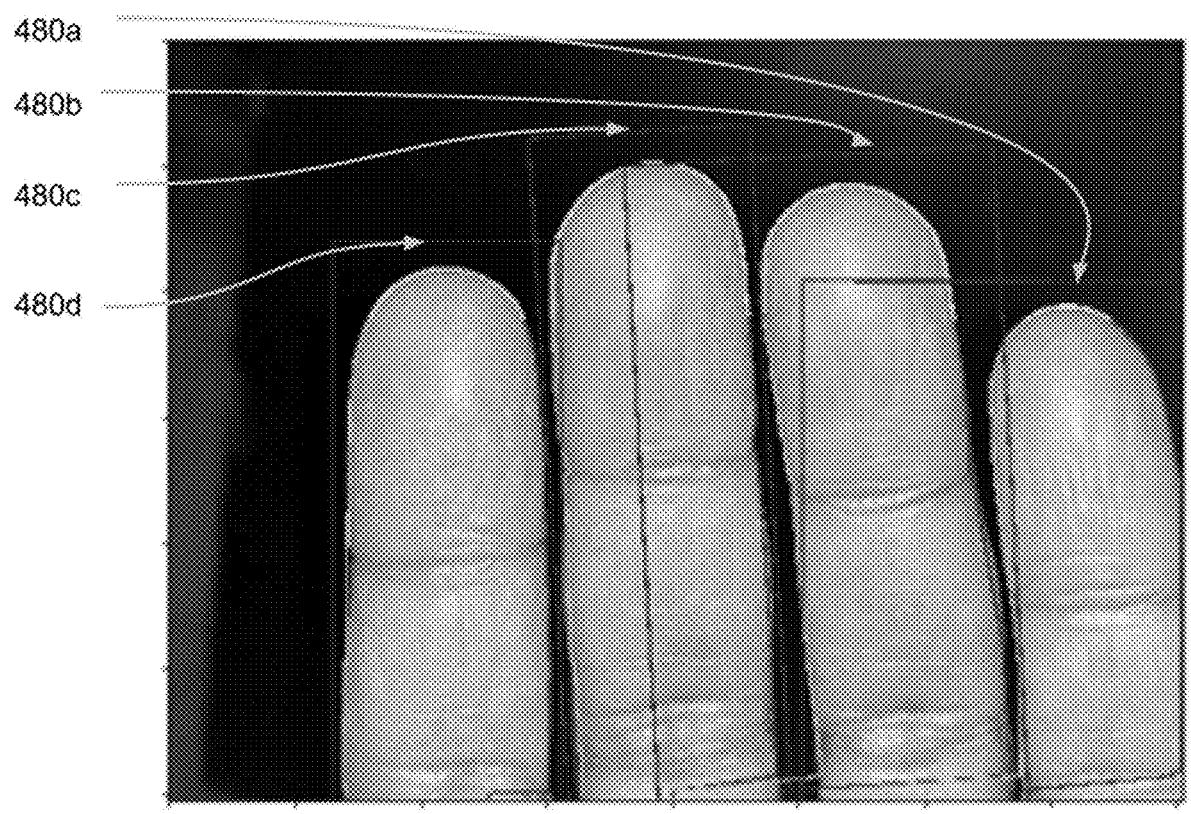
FIG. 4C depicts example finger tip detection, in accordance with some implementations.

FIG. 4C depicts finger tip detection, in accordance with some implementations.

Based on the edges and tips detected, guiding (bounding) boxes may be displayed to indicate successful detection of fingers and finger tips.

In some implementations, a length of the detected finger (detected length) is computed and used to generate a detection score for the image.

Figure 5A:
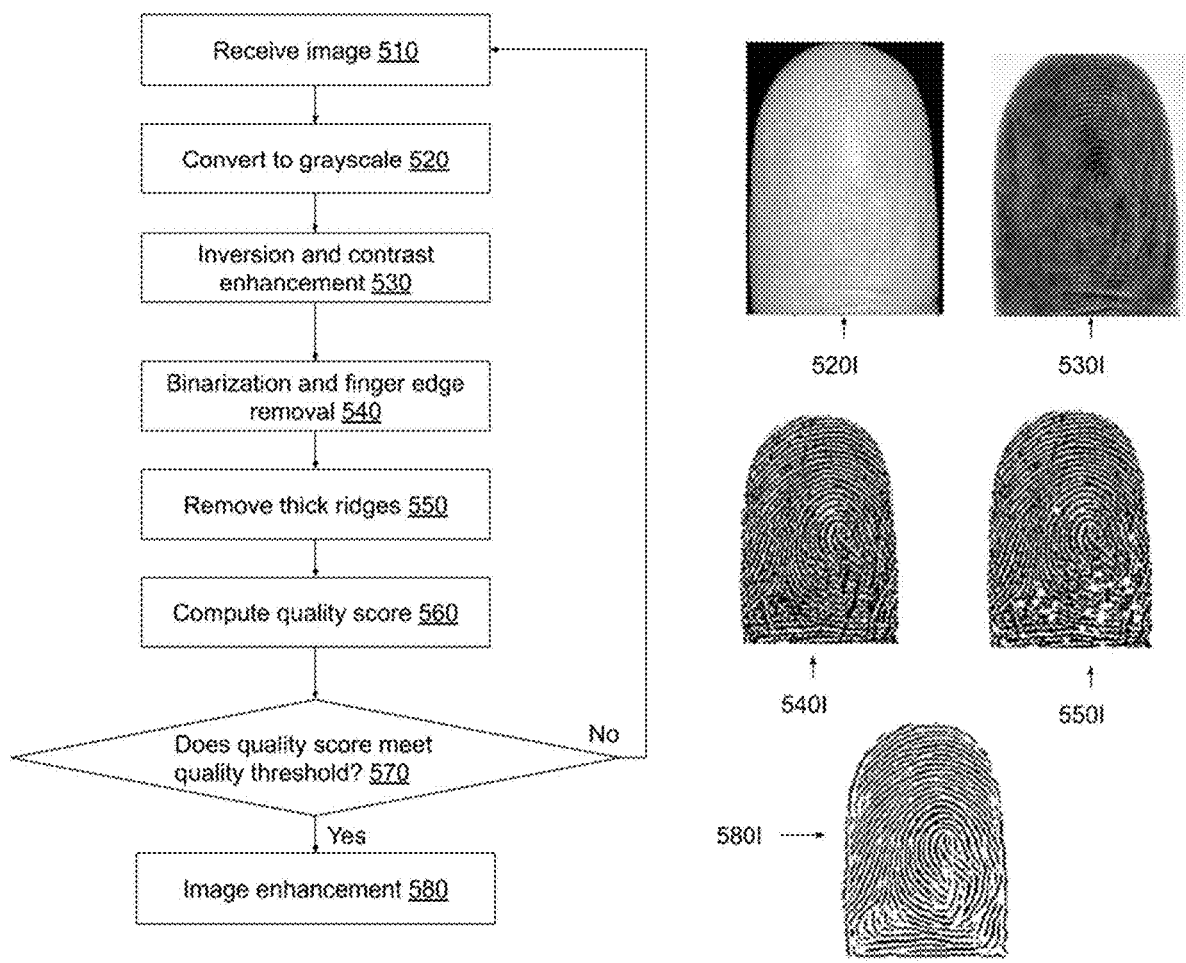
FIG. 5A depicts example finger tip processing, in accordance with some implementations.

FIG. 5A depicts a method for finger tip processing, in accordance with some implementations.

In this illustrative example, finger tip processing is depicted along with example images generated as a result of intermediate processing.

An image (for example, a still image) is received at block 510, which is converted to a grayscale image at block 520. In some implementations, the greyscale image is based on the value (V) channel. An example grayscale image (520I) is depicted in FIG. 5A. Processing continues to block 530.

At block 530, the image is inverted, and contrast in the image is enhanced.

In some implementations, inversion of the image enables the image to include features similar to conventional fingerprint images (for example, those generated using ink based methods).

In some implementations, a contrast limited adaptive histogram equalization (CLAHE) technique may be utilized that may make ridges present in the image to appear more pronounced. A contrast is adjusted adaptively based on areas of the image.

An example image after inversion and contrast enhancement is depicted as 530I. Processing continues to block 540.

At block 540, the image is binarized and any finger edges in the image are removed. An example image after inversion and binarization and finger edge removal is depicted as 540I.

The processing from blocks 510 to 540 may also be referred to as inkification, and converts an image captured optically (for example, by using a smartphone camera) to a type similar to that stored from a traditional ink-based capture of a fingerprint, referred to here as an inkified image.

Processing continues to block 550.

At block 550, thick ridges that may be present in the image are removed. In some implementations, ridges whose width/thickness meets a predetermined threshold are removed. In some implementations, a configurable parameter is used to specify a threshold width of a ridge. The threshold width may be determined relative to a mean ridge width. The configurable parameter may be specified as an aggressiveness factor. In some implementations, the threshold width for a ridge may be 0.011 times the thickness of the finger.

In some implementations, the threshold width may be 0.005, 0.007, 0.009, 0.013, or 0.015 times the thickness of the finger.

In some implementations, the aggressiveness factor may be configured based on the camera model or smartphone model used.

An example image after removal of thick ridges is depicted at 550I.

Processing continues to block 560.

At block 560, a quality score for the image is determined. The quality score may be determined based on a percentage of ridges removed in the image to the total amount of ridges present in the image. In some implementations, a ratio may be computed of a length of removed ridges to a total length of ridges in the image. In some implementations, a ratio of a total area of ridges removed to a total ridge area in the image may be determined and used as the quality score for the image.

Processing continues to block 570. At block 570, the quality score computed at block 560 is compared to a quality threshold.

In some implementations, the quality threshold may be a predetermined number.

If the quality score does not meet the quality threshold at block 570, processing may revert to 510 with a new received image (for example, a repeat of block 305 described with respect to FIG. 3A).

If the quality score meets the quality threshold at block 570, processing proceeds to block 580.

At block 580, image enhancement techniques may be utilized to enhance image quality of the inkified image to enable superior performance of subsequent matching algorithms.

In some implementations, a block-wise Gabor filter may be applied to the image from 550I.

Figure 5B:
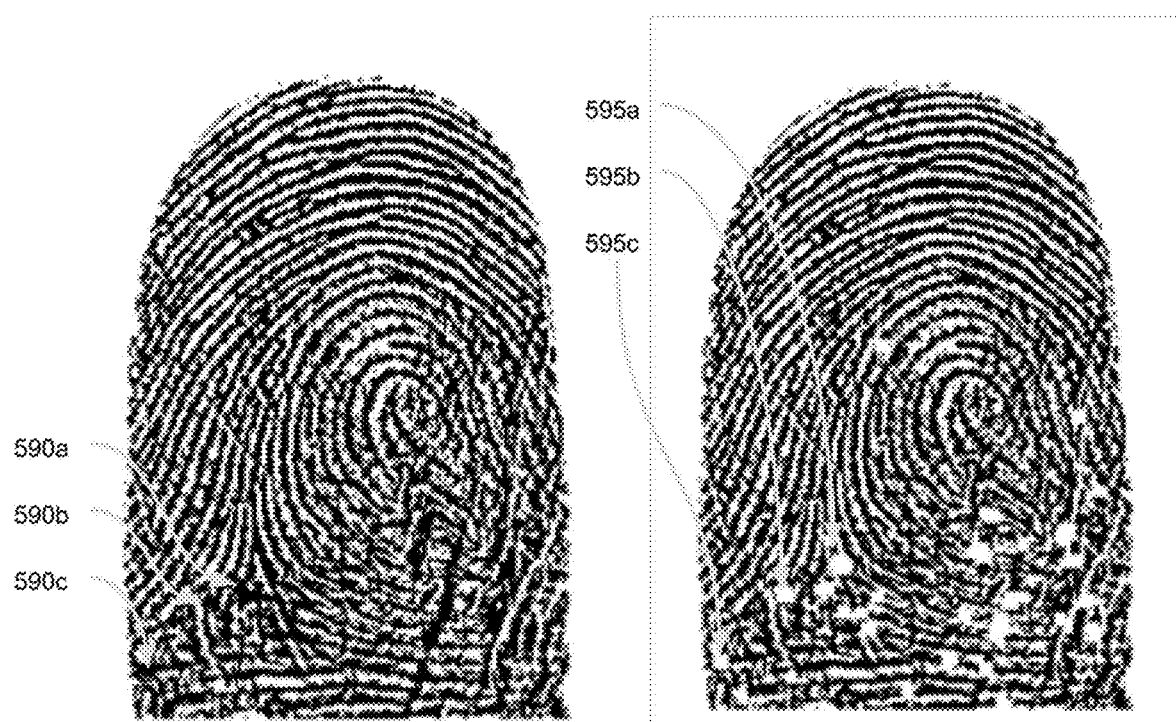
FIG. 5B depicts computation of a quality score in conjunction with finger tip processing, in accordance with some implementations.

FIG. 5B depicts computation of a quality score in conjunction with fingertip processing, in accordance with some implementations.

FIG. 5B depicts regions 590a, 590b, and 590c (additional regions are visible but not marked) that include thick ridges. In some implementations, the ridges may be a result of previous preprocessing and image processing steps at the camera of the smartphone.

The regions of thick ridges are identified are removed. In this illustrative example, this leads to regions with whited-out areas 595a, 595b, and 595c.

As explained earlier, a determination is made as to the percentage of the image where ridge removal was performed. This is used to determine a quality score for the image.

Figure 6A:
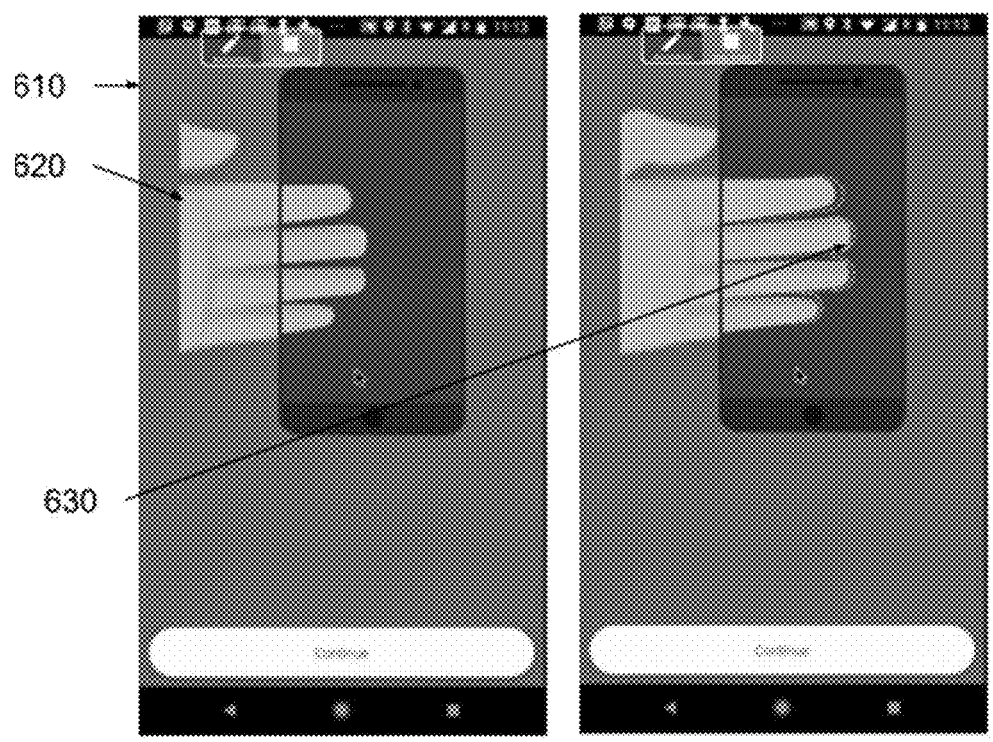
FIGS. 6A and 6B illustrate example screenshots utilized for fingerprint verification, in accordance with some implementations.
Figure 6B:
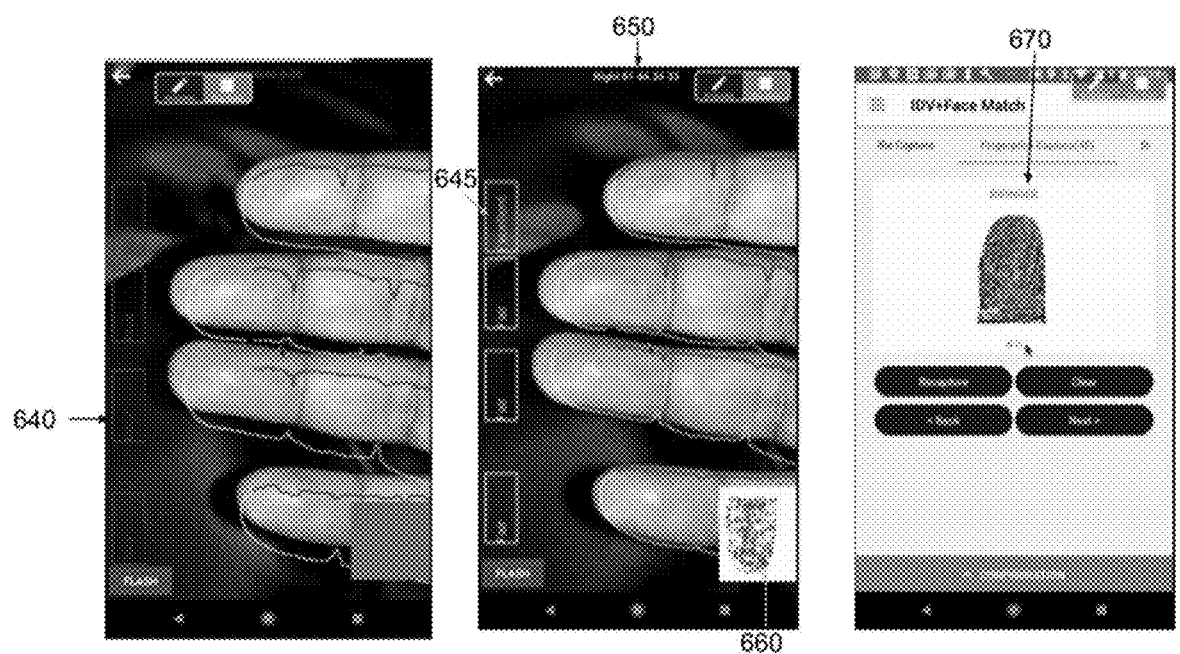

FIGS. 6A and 6B illustrate example screenshots utilized for fingerprint capture in accordance with some implementations.

A user device (for example, a mobile device) may be utilized for the capture of fingerprint. Upon launch of an application (for example, application 150b described with respect to FIG. 1) a user interface may guide a user through a process for fingerprint capture.

In some implementations, a graphical image (620) may be displayed on a display of a user device (610) to guide a user to place their hand such that a camera of the user device may be able to capture an image of the user's hand.

In some implementations, a guide (630) may be displayed on a display to indicate suitable placement of a user's hands and fingers.

Upon detection of a user's hand, an image captured by the camera may be displayed along with an indication of detection quality of the image (640). As the camera adjusts the image, quality scores (650) and a descriptor 645 (for example, poor, fair, excellent, etc.) may be displayed. An inset frame that includes the image (660) may be displayed on the screen.

Upon generation of a fingerprint image after enhancement (for example, 580I described with respect to FIG. 5) may be displayed (670) on a display screen of the user. A user may be provided with options to transmit the image, or repeat the process, etc.

In some implementations, the application may be configured to be utilized by a user to perform self-authentication. In some implementations, the application may be executed in a setting where a service provider (for example, a kiosk or business that provides verification services) captures images of other users for onward transmission.

In some implementations, liveness detection of the hand may be performed to prevent spoofing of the fingers (for example, by using a previously taken picture of the fingers of the subject).

Figure 7:
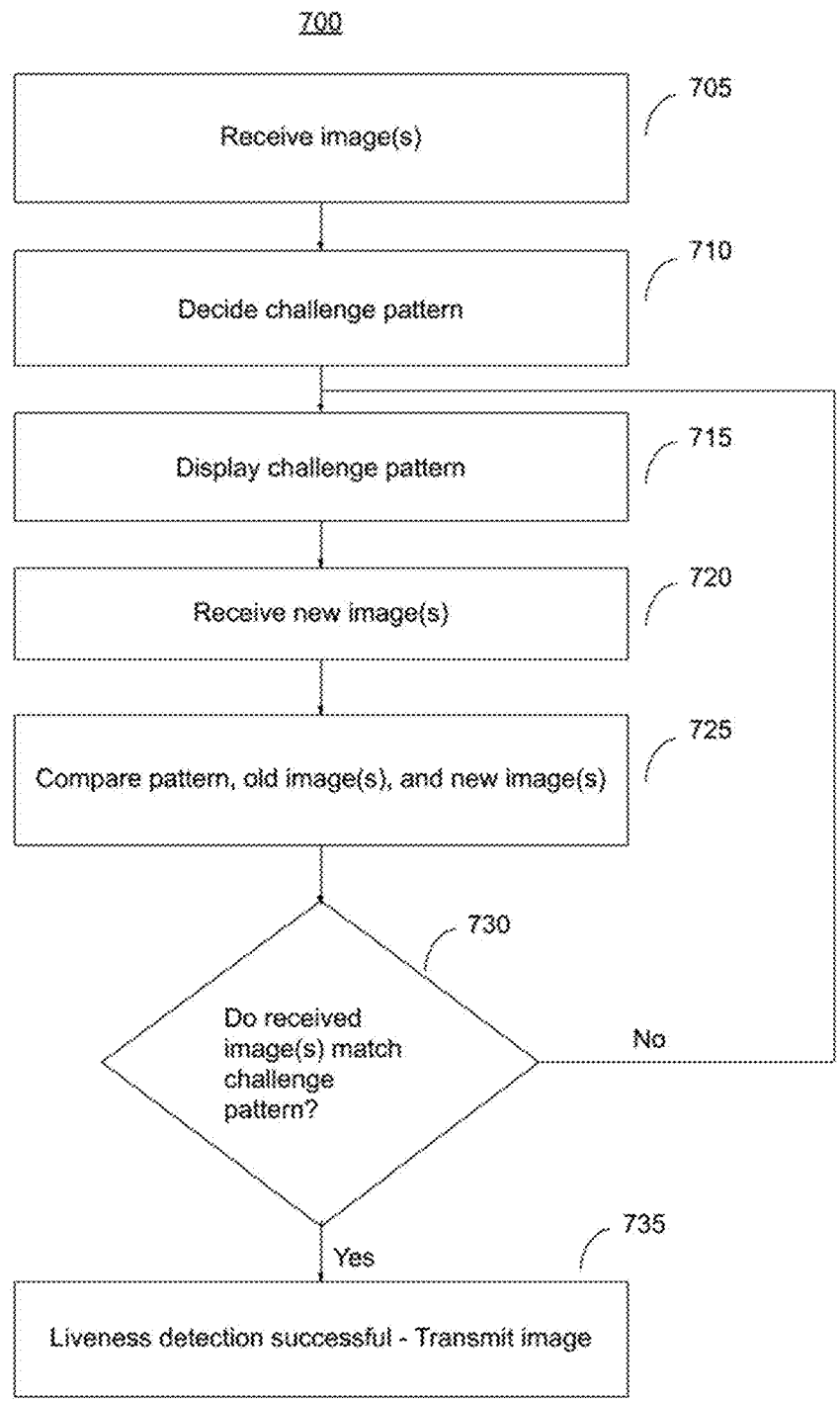
FIG. 7 is a flowchart illustrating an example liveness detection method, in accordance with some implementations.

FIG. 7 is a flowchart illustrating a liveness detection method in accordance with some implementations.

The method 700 begins at block 705, where, an image is received by a processor of a user device (e.g. a user device similar to user device 200 illustrated in FIG. 2.

Processing continues to block 710. At block 710, a challenge pattern is determined in order to detect liveness of fingers identified in the image. The challenge pattern may be a pattern presented to the user, the response to which may be analyzed to determine liveness. Processing continues to block 715.

At block 715, a representation of the challenge pattern is displayed (for example, by utilizing user interface 270 illustrated in FIG. 2). The challenge pattern may be displayed by using sample images of hand(s), or by dotted lines.

In some implementations, the challenge pattern may be a dynamic pattern and illustrated by an animation.

Processing continues to block 720. At block 720, multiple images are captured by a camera (for example, camera 230 illustrated in FIG. 2). The multiple images may be multiple still images or may be multiple frames of a video capture.

Processing continues to block 725. At block 725, the challenge pattern, and the received images are compared to determine liveness.

In some implementations, on-screen distances may be measured at multiple locations along an outline of a finger indicative of a difference between a displayed challenge pattern and the received images. A sum of the squares of the distances may be computed and compared to a predetermined threshold. The sum of the squares of the distances meeting a threshold distance may be indicative of liveness.

In some implementations, at least two different positions for the hand may be used as the challenge pattern. The two positions may have a varying distance between at least four fingers of the hand.

In some implementations, the challenge pattern may include representations of the hand that are indicative of displacement in all three dimensions (for example, x, y, and z directions).

Processing continues to block 730. At block 730, if a determination is made that the received images match the displayed challenge pattern (for example, based on the sum of the squares of the distances meeting a threshold distance), liveness detection is deemed successful, and any captured fingerprint images may be transmitted (735) for additional processing.

If a determination is made that the received images do not match the displayed challenge pattern (for example, based on the sum of the squares of the distances not meeting a threshold distance), liveness detection is deemed unsuccessful, and processing may continue to 715 with the display of a challenge pattern.

Figure 8:
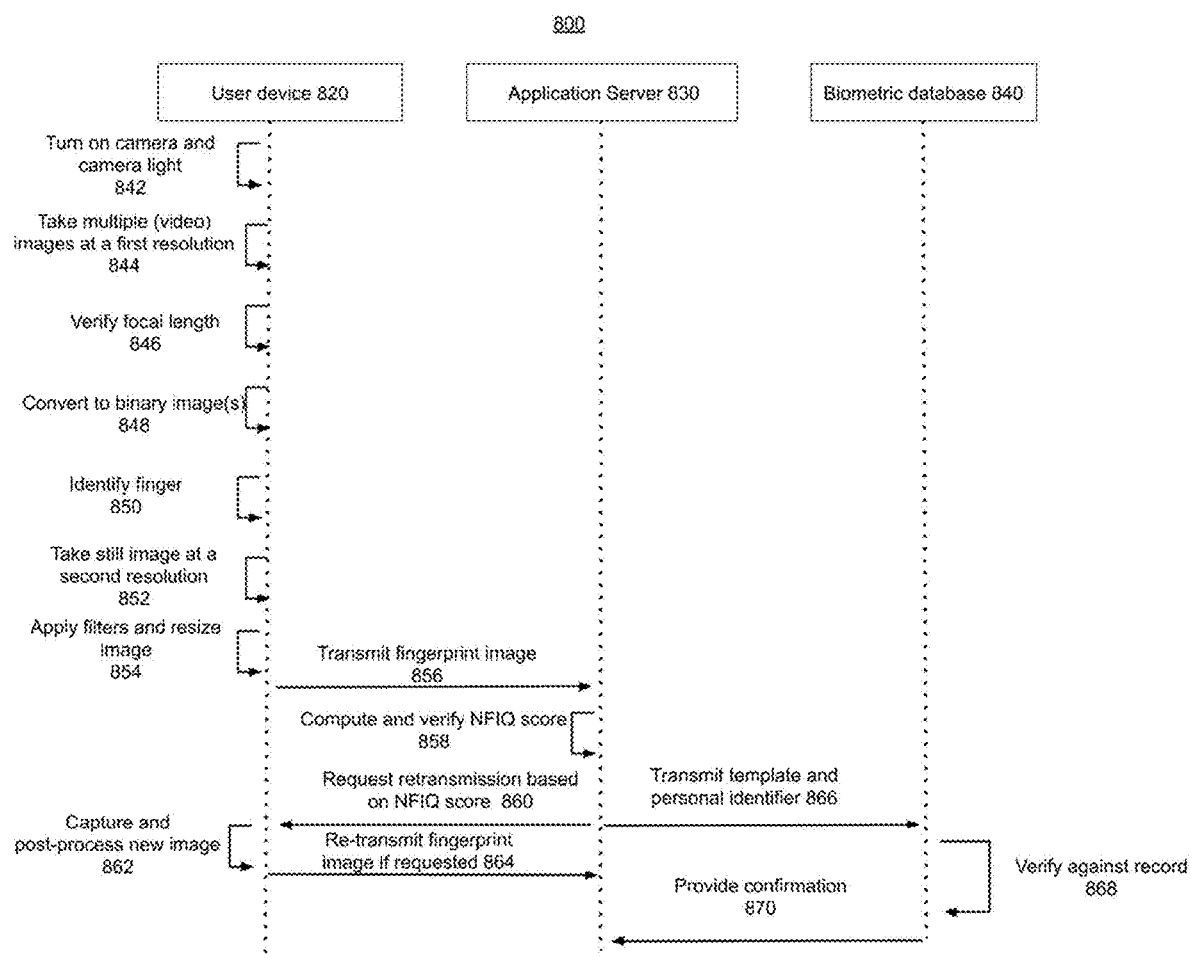
FIG. 8 is a diagram illustrating example biometric capture and verification, in accordance with some implementations.

FIG. 8 is a diagram illustrating biometric capture and verification in accordance with some implementations.

As illustrated in FIG. 8, user device 820, Application server 830, and Biometric database 840 are utilized for an example biometric verification of a user. User device 820 may be any type of user device, e.g., similar to user device 130 described with reference to FIG. 1. Application server 830 may be any server device, e.g., Application server 110 described with reference to FIG. 1. Biometric database 840 may be any type of repository of biometric (e.g. fingerprint) data, e.g., similar to Biometric database 115 described with reference to FIG. 1.

At 842, a camera light and camera are activated at user device 820. At 844, in video mode, multiple frames of images are captured at a first resolution. A focal length of objects identified in the images are verified 846, and the captured images are captured to binary images. Finger(s) are identified 850, and a mode of the camera is changed to a mode configured to capture images at a second (higher) resolution. A still image is captured 852 at the higher resolution. Image processing filters are applied 854 and the image is resized.

At 856, the fingerprint image is transmitted to Application server 830. A NIST Fingerprint Image Quality (NFIQ) score is computed 858 by the Application server. The computed NFIQ score is compared against a threshold for NFIQ quality. In some implementations, the threshold NFIQ score may be set to 4, and the Application server requests 860 a retransmission of a fresh fingerprint image if the received image does not meet the predetermined NFIQ quality threshold. In some examples, a retransmission may be requested by Application server 830 based on an NFIQ value being 3 or greater.

In some implementations, the computation of the NFIQ score and verification may be performed by the user device, and only images that meet the predetermined NFIQ quality threshold are transmitted to the Application server. In such implementations, verification at the Application server may not be performed.

In some implementations, a NFIQ 2.0 score may be computed and used as the metric for fingerprint quality.

After verification of the NFIQ score of the fingerprint image and the NFIQ score meeting the NFIQ quality threshold, Application server 830 transmits 866 a fingerprint template and a personal identifier associated with the user to Biometric database 840.

In some implementations, the personal identifier may be a name, phone number, date of birth, address, or any other identification number that may serve to identify the user whose fingerprints are being transmitted.

Biometric database 840 verifies the received template and personal identifier against a record maintained at the biometric database, and provides confirmation 870 or otherwise to Application server 830.

Figure 9:
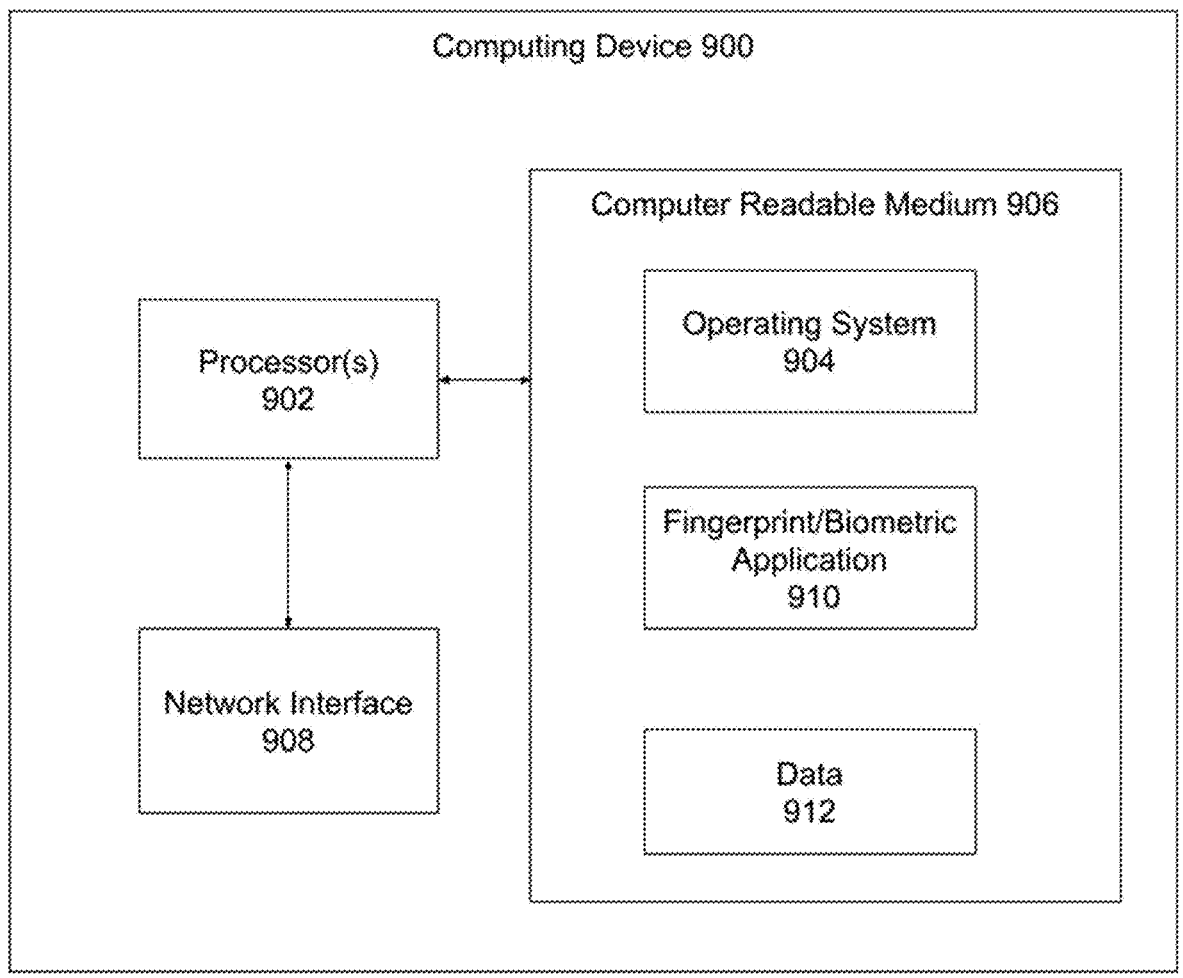
FIG. 9 is a diagram of an example computing device configured for biometric capture and verification, in accordance with some implementations.

FIG. 9 is a diagram of an example computing device 900 in accordance with at least one implementation. The computing device 900 includes one or more processors 902, a non-transitory computer readable medium 906 and a network interface 908. The computer readable medium 906 can include an operating system 904, an application 910 for and a data section 912 (e.g., for storing policies, etc.).

In operation, the processor 902 may execute the application 910 for fingerprint/biometric capture and verification stored in the computer readable medium 906. Application 910 can include software instructions that, when executed by the processor, cause the processor to perform operations for fingerprint/biometric capture and verification in accordance with the present disclosure (e.g., performing one or more of the sequences described above in connection with FIG. 3, 4, 5, 6, 7, or 8). Application 910 can operate in conjunction with the data section 912 and the operating system 904.

It will be appreciated that the modules, processes, systems, and sections described above can be implemented in hardware, hardware programmed by software, software instructions stored on a non-transitory computer readable medium or a combination of the above. A system as described above, for example, can include a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C #.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors, or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a non-transitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for conference session management and control.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer implemented method comprising:
    activating a camera and a camera light on a user device;
    capturing, with the camera, a plurality of images at a first resolution;
    converting, using a processor on the user device, one or more of the plurality of images to corresponding one or more binary images;
    detecting a hand in the one or more binary images;
    identifying at least one finger in the one or more binary images, wherein identifying the at least one finger comprises:
        detecting a left side and a right side of each of the at least one finger based on detecting four pairs of transitions in a horizontal trace of the detected hand; and
        detecting a finger tip based on detection of transitions in vertical traces of the detected hand between the left side and the right side of each of the at least one finger;
    capturing, with the camera, a still image of the at least one finger at a second resolution, wherein the second resolution is greater than the first resolution;
    applying one or more image processing filters to the still image to generate a fingerprint image; and
    transmitting the fingerprint image, over a network, to a server.

2. The method of claim 1, further comprising:
    determining a detection score for the identified at least one finger based on a detected length of the identified at least one finger;
    determining whether the detection score meets a detection threshold;
    if the detection score meets the detection threshold, causing the capturing of the still image at the second resolution; and
    if the detection score does not meet the detection threshold, causing a capturing, with the camera, a second set of a plurality of images at the first resolution.

3. The method of claim 1, wherein the applying one or more image processing filters comprises:
    converting the still image to a grayscale image;
    inverting the grayscale image;
    enhancing contrast in the inverted grayscale image;
    binarizing the contrast enhanced inverted grayscale image; and
    removing finger edges in the binarized enhanced inverted grayscale image to generate an inkified image.

4. The method of claim 3, further comprising:
    identifying ridges in the inkified image; and
    removing ridges thicker than a predetermined width.

5. The method of claim 4, further comprising:
    computing a quality score, where the quality score is based on a percentage of ridges removed;
    determining whether the quality score meets a quality threshold; and
    if the quality score meets the quality threshold, performing image enhancement of the inkified image.

6. The method of claim 5, wherein the image enhancement comprises applying a block-wise Gabor filter enhancement to the inkified image.

7. The method of claim 1, further comprising:
    verifying that a focal length for at least one object in the plurality of images is greater than a minimum focus threshold.

8. The method of claim 1, wherein detecting the hand comprises:
    transforming the one or more binary images to Hue-Saturation-Value (HSV) representations;
    shifting a hue channel in the HSV representations; and
    detecting the hand based on a match of the HSV representations to a skin tone model.

9. The method of claim 1, further comprising detecting liveness of the at least one finger.

10. The method of claim 9, wherein detecting the liveness of the at least one finger comprises:
    determining a challenge pattern for a plurality of fingers against which to match an input pattern;
    displaying, on a screen, a representation of the challenge pattern;
    receiving, from the camera, at least a first image of the hand and a second image of the hand;
    comparing the challenge pattern, the received first image of the hand and the received second image of the hand; and
    determining the liveness of the at least one finger based at least on the comparison of the challenge pattern, the received first image and the received second image.

11. The method of claim 1, further comprising receiving from the server, over the network, a notification indicative of an NFIQ score of the fingerprint image being below a predetermined threshold.

12. The method of claim 1, wherein the first resolution is between 260 pixels and 1080 pixels, and wherein the second resolution is between 2 Megapixels and 6 Megapixels.

13. A system to authenticate a fingerprint image, the system comprising:
a mobile device, wherein the mobile device further comprises a camera and a first processor, the mobile device configured to:
activate the camera and a camera light, wherein the camera is activated to capture a plurality of images at a first resolution;
convert, using the first processor, one or more of the plurality of images to corresponding one or more binary images;
detect a hand in the one or more binary images, wherein to detect the hand, the mobile device is configured to:
transform the one or more binary images to Hue-Saturation-Value (HSV) representations;
shift a hue channel in the HSV representations; and
detect the hand based on a match of the HSV representations to a skin tone model;
locate at least one finger in the one or more binary images;
capture a still image of the at least one finger using the camera at a second resolution;
apply one or more image processing filters to the still image to generate the fingerprint image; and
transmit the fingerprint image and at least one personal identifier associated with the fingerprint image; and
a server, wherein the server comprises a storage device and a second processor, the server configured to:
receive the fingerprint image from the mobile device and the at least one personal identifier associated with the fingerprint image from the mobile device;
determine a NIST Fingerprint Image Quality (NFIQ) for the fingerprint image;
convert the fingerprint image into a template representing minutiae points for each finger; and
transmit the template and the at least one personal identifier to a biometric database for verification.

14. The system of claim 13, wherein the at least one personal identifier comprises name, phone number, date of birth, address, or identification number.

15. The system of claim 13, wherein the server is further configured to match the template and the at least one personal identifier to an entry previously stored in the storage device.

16. The system of claim 13, wherein the server is further configured to receive at least one data element associated with the at least one personal identifier from the biometric database upon verification.

17. A computer-readable storage device encoded with instructions that, when executed, cause one or more programmable processors of a computing device to perform operations comprising:
activating a camera and a camera light, wherein the camera is activated to capture a plurality of images at a first resolution;
converting, using a processor, one or more of the plurality of images to corresponding one or more binary images;
detecting a hand in the one or more binary images;
identifying at least one finger in the one or more binary images;
determining a detection score for the identified at least one finger based on a detected length of the identified at least one finger;
determining whether the detection score meets a detection threshold;
if the detection score meets the detection threshold, causing the capturing of a still image of the at least one finger using the camera at a second resolution;
applying one or more image processing filters to the still image to generate a fingerprint image; and
transmitting the fingerprint image to a server.

18. The computer-readable storage device in claim 17, further comprising
if the detection score does not meet the detection threshold, causing a capturing, with the camera, a second set of a plurality of images at the first resolution.

19. The computer-readable storage device in claim 17, wherein the detection score for the identified at least one finger comprises a detected length of the at least one finger in pixels.

* * * * *